June 29, 1948. J. B. WALKER 2,444,235
PHOTOELECTRIC RANGE FINDER
Filed Dec. 4, 1944

INVENTOR.
JOSEPH B. WALKER,
BY Joseph F. Westall
ATTORNEY.

Patented June 29, 1948

2,444,235

UNITED STATES PATENT OFFICE 2,444,235

PHOTOELECTRIC RANGE FINDER

Joseph B. Walker, Hollywood, Calif.

Application December 4, 1944, Serial No. 566,521

6 Claims. (Cl. 177—352)

This invention relates to range finders, and more specifically contemplates photo-electric devices adapted particularly for use by blind persons by affording means for determining the existence, position, distance, and approximate size of nearby objects.

The characteristic of certain metals to release free electrons when illuminated by ultra violet or ordinary light has found practical application in photo-electric cells which, when connected in an electrical circuit, are employed, as is well known, for the control of numerous types of equipment, color analysis, counting operations, etc. Heretofore the utility of photo-electric devices has been largely confined to furnishing the sole controlling source of electrical energy for the primary circuits of which they are a part, i. e., it is common practice to employ such cells singly as separate circuit controlling units unmodified by current produced by other cells.

A general object of the present invention is to provide a plurality of photo-electric cells to produce or control a flow of electricity through a circuit in which the cells are connected in additive series, whereby each imposes a resistance upon the circuit variable in accordance with the degree of its individual activation by light rays reflected thereto.

More specifically, it is an object to provide a portable unit adapted to be carried by a blind person, embodying photo-electric means operable in response to variations in intensity of light reflected from different points to energize variably an electric signal for indicating audibly or tactually the proximity of objects to the unit.

Another object is to provide apparatus comprising a pair of photo-electric cells connected in the same electrical circuit in combination with an adjustable lens system for the cells, displaced laterally from one another, to expose to the respective cells, slightly different images of the same objects which may be located at various distances from the apparatus, whereby differences in the illumination of the respective images transmitted by the lens systems energizes the photo-electric cells to produce an electric current available in a conductor for activating signal or control devices.

Another object is to provide an interrupter to make and break the flow of current through a shunt, extending across serially connected photoelectric cells, adapted to carry the difference in current produced by the respective cells.

Still other objects and corresponding advantages of my invention, as for example simplicity of construction, ease of adjustment and operation, lightness of weight of the materials required, and susceptibility to numerous applications and uses, will be apparent to those of skill in the art to which my invention appertains, from an examination of the following description read in the light of the accompanying drawings in which.

Figures 1, 2:
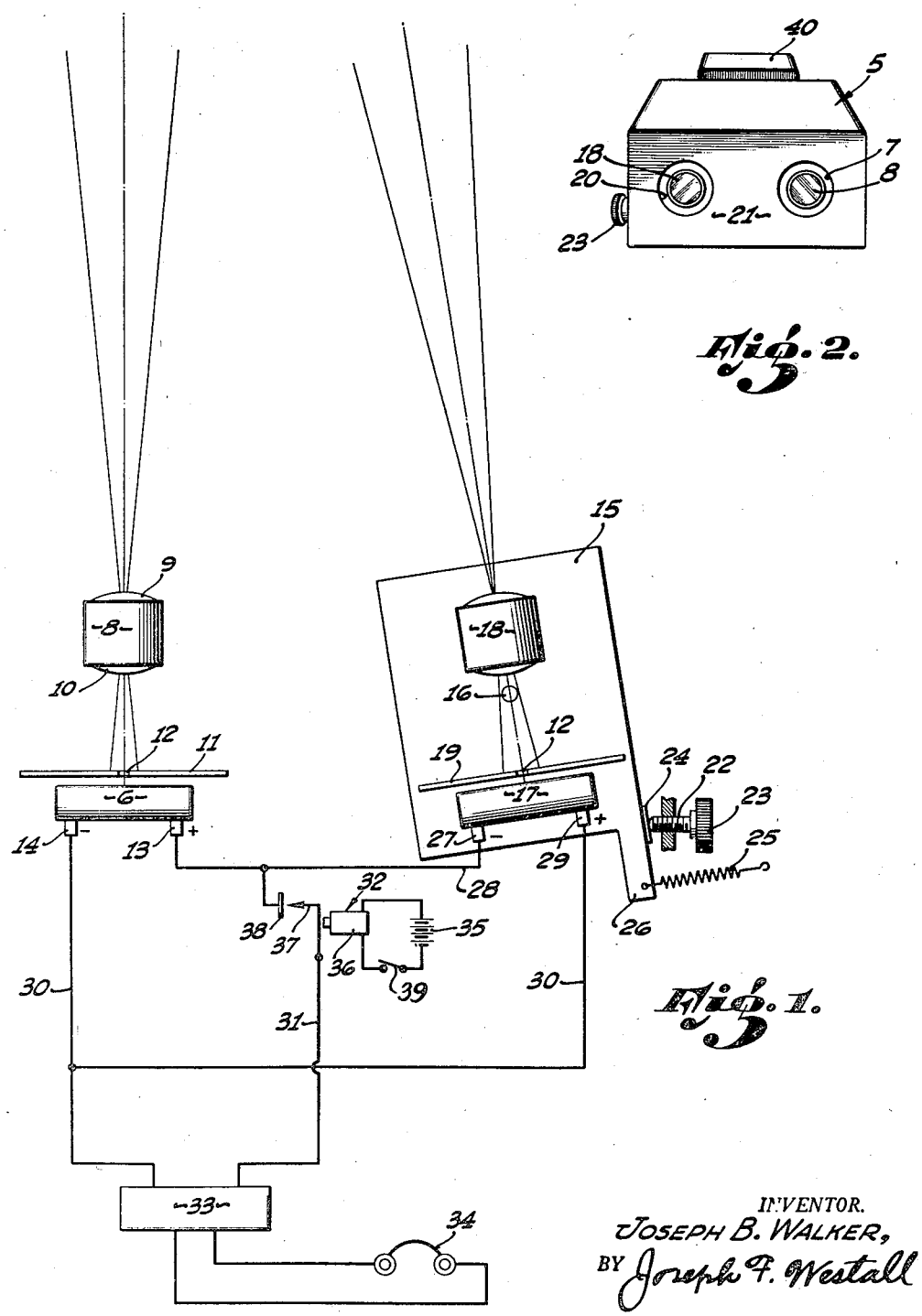
Fig. 1 illustrates schematically one embodiment of the apparatus of my invention.
Fig. 2 is an elevation of a case in which the structure depicted in Fig. 1 may be enclosed.

Referring more specifically to the drawings, 5 designates a case which is merely illustrative of one device in which the unit may be mounted to facilitate transportation and manipulation in use and insure insulation. Suitably mounted within and at one side of the case is a photo-electric cell or tube 6 (see Fig. 1) of conventional design and construction. Cell 6 is arranged to align its light aperture (not shown) with an opening 7 in the case through which the light for activating cell 6 is permitted to enter. Interposed between opening 7 and cell 6 is a lens system 8 consisting of a pair of fast photographic lenses 9 and 10 axially aligned with the opening 7 and the light aperture of the cell, to register an image of the object or objects located exteriorly of the case upon which the lenses may be focused through the opening.

The lenses 9 and 10 are preferably composed of plastic to permit of a more economical and lighter construction, a high degree of correction being unnecessary. A mask 11 is located between the photo-electric cell 6 and lens system 8, having a slit 12 therein coaxially aligned with the lenses, for the primary purpose of restricting the effective field of the latter, and may be utilized to perform an additional function hereinafter referred to. It will thus be seen that by shifting case 5, the lens system 8 may be focused upon any object within its focal range so as to produce a current flowing from the positive to the negative terminals of the cell, indicated by the numerals 13 and 14, respectively.

A supporting plate 15 is pivotally mounted within case 5 on a pin 16 for movement in a horizontal plane. A second photo-electric unit, identical to that hereinabove described, consisting of a cell 17, lens system 18, and interposed mask diaphragm 19 is mounted by suitable means upon plate 15 with the axes of lens systems 8 and 18 of the respective photo-electric units lying in a single plane perpendicular to the axis of pin 16 on which plate 15 is pivoted. An opening 20 in the front panel 21 of case 5 is in alignment with the axis of the lens system to permit focusing of lens system 18.

It is important in the operation of the particular embodiment illustrated that the photo-electric cells 6 and 17 function identically in response to the same light values, i. e., that the current produced by each of them is the same when their respective lens systems admit light of the same value, in order to provide a constant from which variations in the difference in current produced by the respective cells when activated by light of different value, may be measured and utilized to produce an audible or tactual indication of corresponding value. To assure this identity for practical purposes, the respective lens systems 8 and 18 are both focused upon the sky or upon a white sheet or other medium from which the light reflected to each lens system is of the same intensity, whereupon the stop opening (not shown) of one or both of the lens systems is adjusted, the desired effect being indicated by the amperage produced at the negative terminals of the respective cells. In lieu of stop openings in the lens systems, the mask diaphragms 11 and 19 may be equipped with adjustable stop openings; the mechanism required therefor, forming no part of the present invention, is not illustrated or described in detail.

The angular relationship of the two photoelectric units is variably determined by means of an adjusting screw 22 which is disposed at one side of the plate and rotatable in a suitable bracket carried by case 5. The knurled head 23 of screw 22 projects through an opening (not shown) in the case, where it is readily accessible for adjustment. The end of screw 22 is adapted to abut against a bearing member 24 attached to or integral with the rearward edge of plate 15 adjacent the side of the case, whereby threading of the screw inwardly against bearing 24 shifts the plate and narrows the angle formed between the axes of the two photo-electric units 6 and 17. A helical spring 25, having one end fastened to a suitable stationary bracket (not shown) within the case, has its opposite end connected to an extension 26 of the plate adjacent bearing 24 to maintain the latter in contact with screw 22.

The negative terminal 27 of the movable photo-electric cell 17 is connected electrically by conductor 28 with the positive terminal 13 of cell 6. Similarly positive terminal 29 of cell 17 is connected by conductor 30 with the negative terminal 14 of cell 6. A conductor 31, connected between conductors 28 and 30, has interposed between its ends a conventional interrupter 32, amplifier 33, and ear phones 34, arranged electrically in series, as will be obvious to those of skill in the art.

The interrupter 32 comprises a battery 35, a coil 36, and an oscillating element 37 activated by coil 36 to make and break the flow of current through conductor 31 at point 38. A switch for controlling the flow of current in the secondary circuit through interrupter 32 is illustrated diagrammatically at 39. 40 indicates a strap or handle by which the case may be carried.

The operation and use of the embodiment of my invention illustrated is briefly described as follows:

As will be obvious, the apparatus may be small enough for a blind person to carry in one hand with the photo-electric units disposed in substantially the same horizontal plane. The movable photo-electric unit is then adjusted by rotation of the knurled head 23 of screw 22 to cause the axes of the two lens systems 8 and 18 to converge at a predetermined approximate distance from the unit. To assist a blind person in determining approximately this point of convergency of the lens axes, the head 23 of adjusting screw 22 may be equipped with a pointer (not shown) adapted to register with a dial carried by the wall of the case. By providing a dial having raised numerals or other appropriate indicia designating focal length, the blind user can ascertain tactually the approximate distance between himself and the point at which the axes of the lenses converge. Light reflected from an object to be detected to both of the cells is thus effective to activate the primary circuit, i. e., produce a flow of electricity from the terminal 13, conductor 28, terminals 27 and 29, and thence to terminal 14 through conductor 30. It will be noted that with the lens systems focused upon objects located at distances of approximately twenty feet or more, depending upon illumination, sensitivity of the apparatus and upon spacing of the lens systems, the images carried by the respective lenses will be substantially identical in reflected light value. Accordingly, the current produced by the respective cells 6 and 17 will be of substantially the same amperage.

Under such circumstances, the resistance of each cell is equal to that of the other and no current flows through conductor 31. However, due to the spaced relationship of the lens systems, when the latter are adjusted to widen the angle formed between their axes so that the point of convergence is less than twenty feet distant, the difference in light intensity of the images registered on the respective lenses progressively increases and is more effective for the purposes contemplated. As the current flowing through conductors 28 and 30 will be limited by the total resistance of the cells, the excess current produced by either cell, passes through shunt 31. This current, intermittently broken by the interrupter 32 and amplified, is detected by the user through the ear phones 34 as a buzzing sound.

Generally the closer the object focused upon, the greater will be the contrast in light values, resulting in greater amperage in the shunt circuit which is, in turn, manifested by greater volume of sound in the ear phones.

It has also been found that by moving the device from side to side the buzzing sound normally heard in the ear phones as a result of focusing upon objects having different light reflective properties, or which are exposed to light of different intensities, will be interrupted by a series of "clicks." Short practice enables the operator to ascertain by the sound of the "clicks," i. e., their volume and frequency, the approximate distance of the objects causing them and also whether they are large objects, as for example another person or a series of small objects such as the pales of a picket fence, foliage, or the like.

A buzzer (not shown) may be included in the shunt 31, eliminating the necessity of ear phones 34, if desired, as will be obvious without specific illustration. By locating the buzzer adjacent an opening in the case, it may be felt by the finger of the operator so as to enable him to tactually gauge the strength of the current produced in the shunt conductor even though he may also be deaf.

As will be apparent to those of skill in the art, color filters (not shown) may be used to advantage with colored lights as a means for guiding blind persons from one point to another or for other purposes. For example, a wheel containing a plurality of different filters may be interposed between each lens system and the photoelectric cell with which the lenses, respectively, are associated to permit selective coaxial alignment of any of the filters with the lenses by rotation of the wheel. The wheels may have indentations or projections on their peripheries, whereby a blind user may quickly ascertain which filter is in the light path. As each filter of each wheel is adapted to admit light of only a certain color to the photo-electric cells, the dominant color of the light activating the cells can be quickly determined by successive alignment of the filters with the cells and lenses, incident to spinning the wheels. A single color filter wheel might be employed for this purpose if the other cell is rendered temporarily inoperative by a shield or the like.

It will thus be seen that I have provided a novel association and utility of photo-electric cells by wiring such cells together in a manner which enables the production of an electric current of a strength proportionate to the difference between the intensities of light emanating from different sources, and have further provided a unit utilizing such equipment by which blind users may gauge the approximate distance, position, and size of objects near them.

While I have shown and described but one embodiment of my invention, it will be apparent to those of skill in the art that numerous changes in size, design, shape and number of the various parts may be made, that the amplifier may be omitted if desired, that while in the preferred form the photo-electric cell, mask, and lens system of each unit are in alignment, the lens systems may be utilized for directing light rays entering the case at spaced points to photo-electric cells disposed in any part of the case, that in other modifications hereof the axes of the lens systems may be parallel so as to focus upon adjacent points in the focal plane, and while, in the present embodiment one entire photo-electric unit is movable with respect to its counterpart, only the masks may be movable, i. e., slidable, for confining the light admitted to the respective cells to that emanating from sources located different distances from the apparatus—all without departing from the spirit of my invention as defined by the appended claims.

What I claim and desire to secure by Letters Patent is:

1. In a device of the character described, a pair of photo-electric cells, lens systems arranged with respect to one another to receive light rays emanating from different points and to direct said rays into said cells, respectively, conductors connecting said photo-electric cells in series, an electric signal shunted across said conductors for actuation by the current produced by one of said cells in excess of the other, and means to vary the angle formed between the optical axes of said lens systems to correspondingly change the distance between the focal planes of said lens systems, respectively, and said cells.

2. In a device of the character described, a pair of photo-electric cells, means to support said cells in spaced relation, means to direct light rays from the same source into said cells, conductors to connect said cells in series, a shunt conductor across said last-named circuit to carry the current produced in one cell in excess of that generated in the other cell, and means to vary the angle between the optical axes of said lens systems.

3. In a device of the character described, a pair of photo-electric cells, a lens system for each cell to direct light rays into said cells, respectively, means to connect said cells in series, and a pair of masks having stop openings therein interposed in the light path to said cells, respectively, said stop openings being of relative size to compensate for basic inequalities in the photo-electric cells whereby the current produced by the two cells when exposed to the same light will be of the same value.

4. In a device of the character described, a pair of photo-electric cells, a lens system for each cell to concentrate light rays emanating from an illuminated object into said cells, respectively, and means to adjust said lens systems to converge their axes at selectively different distances from said cells, and an indicator activated in response to electromotive force generated in one of said cells in excess of that generated in the other of said cells.

5. In a device of the character described, a pair of photo-electric cells, a lens system for each cell to concentrate light rays upon said cells, respectively, and a mask interposed between each of said cells and its lens system having stop openings therein coaxially aligned with said lens systems, respectively, said stop openings being of relative size to compensate for inequalities in the photo-electric cells affecting their production of electric current.

6. In a device of the character described, a box having a pair of spaced openings in one side thereof, a pair of photo-electric cells, means to support one of said cells within said box in a position to receive light through one of said openings, a mounting pivotally supported within said box adjacent the other opening thereof, the second of said cells being carried by and movable with said mounting to receive light through the other of said openings in said box, and a lens system associated with each of said photo-electric cells to focus upon a common point spaced a predetermined distance from the box, a screw projecting through one side of said box to shift the position of said mounting and vary the distance of the vertex of the angle formed between the optical axes of said lens systems with respect to said cells, and a handle on said box to facilitate portability and direction of the box with the openings disposed in substantial horizontal alignment.

JOSEPH B. WALKER.

REFERENCES CITED

The following references are of record in the file of this patent:

UNITED STATES PATENTS

| Number | Name | Date |
|---|---|---|
| 1,820,357 | Lindstrom et al. | Aug. 25, 1931 |
| 1,983,882 | Rosenfeld | Dec. 11, 1934 |
| 2,133,241 | Baker | Oct. 11, 1938 |

FOREIGN PATENTS

| Number | Country | Date |
|---|---|---|
| 394,853 | Great Britain | July 6, 1933 |

OTHER REFERENCES

Measurement of turbidity in liquids, Electronics, June 1942, page 96.